(12) United States Patent
Bretan

(10) Patent No.: US 10,375,177 B1
(45) Date of Patent: Aug. 6, 2019

(54) IDENTITY MAPPING FOR FEDERATED USER AUTHENTICATION

(71) Applicant: Amazon Technologies, Inc., Seattle, WA (US)

(72) Inventor: Matthew Ira Bretan, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 400 days.

(21) Appl. No.: 15/188,153

(22) Filed: Jun. 21, 2016

(51) Int. Cl.
*G06F 15/173* (2006.01)
*H04L 29/08* (2006.01)

(52) U.S. Cl.
CPC .......... *H04L 67/146* (2013.01); *H04L 67/306* (2013.01)

(58) Field of Classification Search
CPC ........................... H04L 67/146; H04L 67/306
USPC .................................................. 709/223–226
See application file for complete search history.

(56) References Cited

U.S. PATENT DOCUMENTS

| | | | | |
|---|---|---|---|---|
| 7,590,761 B2 * | 9/2009 | Raphael | .............. | H04L 63/0281 709/226 |
| 8,346,929 B1 * | 1/2013 | Lai | .......................... | H04L 67/02 709/226 |
| 8,762,512 B1 * | 6/2014 | Sundaram | ........... | H04L 63/0815 709/223 |
| 8,775,602 B2 * | 7/2014 | Chu | ........................ | H04L 63/10 709/224 |
| 8,856,957 B1 * | 10/2014 | Roth | .................... | H04L 63/0884 713/155 |
| 9,191,381 B1 * | 11/2015 | Popp | ....................... | G06F 21/34 |
| 10,142,378 B2 * | 11/2018 | Koeten | ............... | H04L 65/1073 |
| 2016/0044124 A1 * | 2/2016 | Sarukkai | ................. | H04L 67/42 709/224 |
| 2016/0072778 A1 * | 3/2016 | Panton | .................. | H04W 76/14 713/171 |
| 2016/0366119 A1 * | 12/2016 | Rykowski | ............... | G06F 21/41 |

\* cited by examiner

*Primary Examiner* — Bharat Barot
(74) *Attorney, Agent, or Firm* — Davis Wright Tremaine LLP

(57) ABSTRACT

An identity mapping service receives, from an administrator of an account via a federated identity generated through an identity broker of a datacenter, a request to add a new user to the account. The identity mapping service validates the federated identity and generates a link that can be used by the user authorized to utilize the new user to access the new user. The identity mapping service uses the electronic address of the user to transmit the link to the user of authorized to utilize the new user to enable the user authorized to utilize the new user to access the new user. The identity mapping service associates the new user with the account and enables the new user to access one or more computing resources associated with the account via a second federated identity generated through the identity broker of the datacenter.

20 Claims, 10 Drawing Sheets

IDENTITY MAPPING FOR FEDERATED USER AUTHENTICATION

BACKGROUND

Customers and other enterprise organizations often turn to computing resource service providers and other service providers to obtain programmatic access to their computing resources. Under many circumstances, these customers and other enterprise organizations utilize federation to ensure that only authorized entities can manage the computing resources of the customers or other enterprise organizations. However, using federation to enable entities within a customer organization to access these computing resources can be difficult. For instance, manipulation of existing tools and services is often required in order to enable these entities within a customer organization to access a customer's computing resources within the service provider environment. Further, federation sessions may be time-limited, which may further impact the ability of these entities to access the customer's computing resources effectively.

BRIEF DESCRIPTION OF THE DRAWINGS

Various techniques will be described with reference to the drawings, in which.

DETAILED DESCRIPTION

Figure 1:
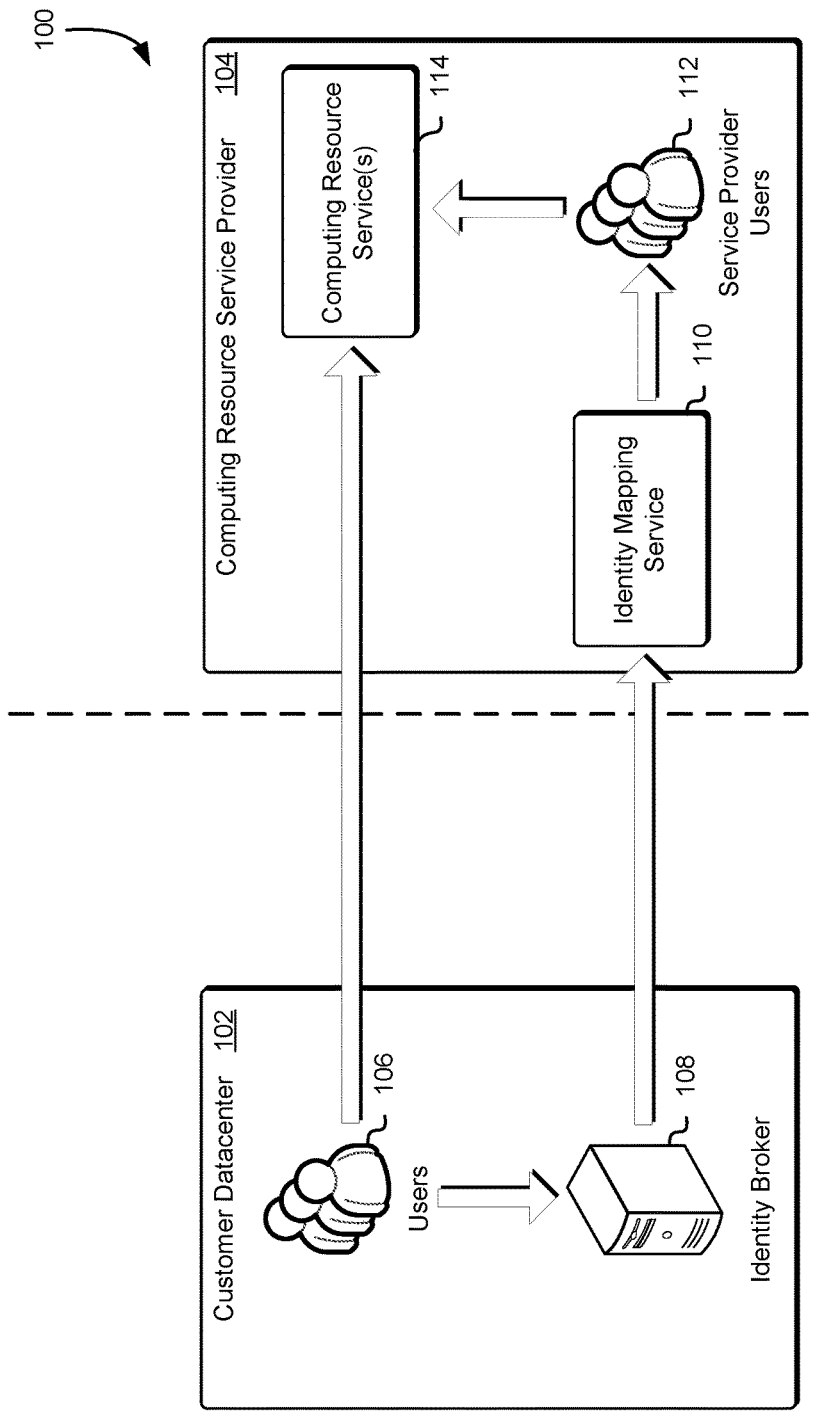
FIG. 1 shows an illustrative example of an environment in which various embodiments can be implemented.

This disclosure relates to the use of an identity mapping service provided by a computing resource service provider to enable federated users to perform various trusted actions that are logged for audit purposes. In an example, an administrator or owner of an external organization that maintains a user account within a computing resource service provider network, accesses an identity mapping service portal via federated identity to add a new user to the user account. Through the portal, the administrator or owner may submit a request to add a new user to the user account, specify any groups to which the new user will belong to, and any roles that the new user can assume in relation to the account. The identity mapping service may prompt, through a graphical user interface (GUI), the administrator or owner to provide contact information for the new user that is to be added to the user account. If the administrator or owner provides valid contact information for the new user, the identity mapping service may transmit a notification to the new user using the provided contact information. The notification may include a link to the identity mapping service portal as well as a hashed key that may be used by the owner of the new user to finalize the creation of the new user within the user account.

The owner of the new user may utilize the link provided in the notification to access the identity mapping service portal via its own federated identity. The owner of the new user may provide the hashed key to the identity mapping service through the portal. The identity mapping service may evaluate the hashed key to determine whether the hashed key is valid. If so, the identity mapping service may prompt, through a GUI, the owner of the new user to generate a unique username for the user account. Additionally, the identity mapping service may provide the owner of the new user with a temporary password or other credential that may be used to access the user account or any of the computing resource services to which the user account maintains a variety of computing resources. The identity mapping service may generate the new user within the user account and apply any existing applicable policies to the new user. The owner of the new user may utilize the unique username and temporary password or credential to login to the user account and access any of the computing resources made available through the user account, subject to the policies applicable to the new user.

In some examples, an administrator or owner of an external organization or other owner of a particular user account can access the identity mapping service portal via a federated identity to request modification, deletion, or addition of a policy that may be applied to the user account or to specific users of the user account. For instance, through the portal, an administrator or owner may evaluate any existing policies that have been created and which accounts these policies have been applied to. Further, the administrator or owner may evaluate, through the portal, any global policies that may only be manipulated by the administrator or owner of the external organization. Through the portal, the administrator or owner may select an existing policy to modify, apply the policy to a new user account, or delete the policy. Additionally, the administrator or owner may create a new policy that can also be applied to any of the user accounts that they administrate or own. In response to any changes to an existing policy or to the addition of a new policy, the identity mapping service may evaluate the changes to the existing policy or the new policy against the global policies applicable to the user accounts. If there is a conflict, the identity mapping service may deny the request and/or prompt the administrator or owner to revise the policy to address the conflict. However, if there is no conflict between the existing or new policy and the global policies applicable to the target user accounts, the identity mapping service may access each affected user account that is to be updated and make any corresponding changes necessary to make the new policy or existing policy applicable to the user accounts.

Through the identity mapping service portal, a user account owner or administrator may request removal of a user from a user account. For instance, the user account owner or administrator may access the portal via a federated identity and select the user account from which it would like to remove the user from or select the user itself from various user accounts at once. In an alternative example, if the user account owner or administrator is departing from the external organization, the user account owner or administrator can submit a request, through the portal, to remove all user accounts owned by the user account owner or administrator. In response to either request, the identity mapping service may delete the user from the affected accounts and, if the user is the owner or administrator of a user account, remove the user account. In some examples, if the user account is owned or administered by a user that is to be removed and the account is marked as a service account, the identity mapping service may assign ownership of the user account to a secondary account owner. Further, the identity mapping service may transmit a notification to this secondary account owner to indicate the change of ownership of the account. The identity mapping service may require the secondary account owner to acknowledge ownership of the account and to select a new secondary owner of the account.

In this manner, the identity mapping service may utilize a managed portal to allow federated users to authenticate to the identity mapping service and perform trusted actions that are logged for auditing purposes. In addition, the techniques described and suggested herein facilitate additional technical advantages. For example, because an administrator or owner of an external organization is required to provide contact information for an owner of a new user for a user account within the computing resource service provider network, the identity mapping service may map the new user back to an entity within the external organization. Further, since activities performed using the identity mapping service portal are logged, an administrator or owner of an external organization may evaluate log data from the identity mapping service to audit use of computing resources by particular users enabled to access computing resources via a federated identity and through the new users generated within the computing resource service provider network.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a user 106 of a customer datacenter 102 transmits a request for authentication to an identity broker 108 within the customer datacenter 102. The customer datacenter 102 may be part of the customer's organization and may operate within a separate network from the computing resource service provider network. In the request for authentication, the user 106 may provide a set of credentials to the identity broker 108 that may be used to authenticate the user 106. The set of credentials may be specific to the customer's organization. In response to the request, the identity broker 108 may access an identity store of the customer datacenter 102 or of the customer's organization to determine whether the set of credentials are valid and, if so, whether the user 106 can be authenticated. Further, the identity broker 108 may use the identity store to determine the user's role within the customer organization. For instance, the identity broker 108 may determine whether the user 106 is an administrator or owner of the customer's organization (e.g., a user of the customer's organization or other external entity that is authorized to manage user accounts on behalf of the customer's organization or other external entity).

If the user 106 is successfully authenticated by the identity broker 108, the identity broker 108 may construct an identity assertion for the user 106, such as a Security Assertion Markup Language (SAML) assertion, that includes authentication information for the user 106, as well as other information about the user 106 that may be used to make access-control decisions. The user 106, through the identity broker 108, may provide this identity assertion to the computing resource service provider 104 to access an identity mapping service 110. The identity mapping service 110 may evaluate the identity assertion from the identity broker 108 and determine whether the user 106 may access the identity mapping service 110. Further, the identity mapping service 110 may determine, based at least in part on the identity assertion provided by the identity broker 108, whether the user 106 is an owner or administrator of one or more user accounts within the computing resource service provider network. For instance, the identity mapping service 110 may identify, through a policy management service, one or more policies that may be applicable to the user 106 within the computing resource service provider network. The policy management service or the identity mapping service 110 may maintain a mapping of users within the customer datacenter 102 to different roles within the computing resource service provider network. Thus, the identity mapping service 110 may utilize the identity assertion from the identity broker 108 to assign a role to the user 106 based at least in part on the mapping. This may enable the user 106 to access the identity mapping service 110 via a federated identity.

In an embodiment, if the user 106 accessing the identity mapping service 110 via a federated identity is an owner or administrator of a user account for the computing resource service provider 104, the identity mapping service 110 may enable the user 106 to add one or more service provider users 112 to the user's 106 computing resource service provider user account. For instance, the identity mapping service 110 may utilize the user's 106 identity assertion to identify one or more user accounts owned or administered by the user 106. The identity mapping service 110 may present these user accounts to the user 106 through an interface, such as a GUI, to allow the user 106 to select the one or more user accounts to which the user 106 would like to add one or more new service provider users 112.

If the user 106 selects, through the interface, a user account and specifies that it would like to add one or more service provider users 112 to the account, the identity mapping service may transmit a request to the user 106 to provide contact information for the one or more users 106 within the customer datacenter 102 or organization that will be the owner (e.g., a user within the customer datacenter 102 authorized to utilize a service provider user 112) of the one or more service provider users 112. For instance, the identity mapping service 110 may require that the user 106 provide an e-mail address of a user that will be an owner of a service provider user 112. While e-mail addresses are used extensively throughout the present disclosure for the purpose of illustration, other contact information for users 106 may be provided by the user 106 that is the user account owner or administrator. For instance, the user 106 may provide a telephone number, physical mailing address, instant messaging information, and the like. Further, communications with the one or more users 106 that are to be the owner or administrator of a new service provider user 112 may be provided via e-mail, Short Message Service (SMS) messages, text messages, instant messaging messages, physical mailing, and the like.

In addition to the contact information for the one or more users 106, the owner or administrator of a user account may use the interface of the identity mapping service 110 to select the group that the new service provider user 112 is going to belong to and the one or more roles that the new service provider user 112 may assume. The assignment of groups and roles may be used to determine which computing resource policies may be applicable to these new service provider users 112. For instance, computing resource policies may be authored based at least in part on organizational business needs and/or may be based on roles within that organization so that, for example, all software developers have the same computing resource policy. The principal of a computing resource policy may be a user, or a group of users, or a role associated with a group of users, or a process representing one or more of these entities that may be running on one or more remote (relative to the computing resource service provider 104) computer systems, or may be some other such computer system entity, user, or process. Each user, group, role, or other such collection of principals may have a corresponding user definition, group definition, role definition, or other definition that defines the attributes and/or membership of that collection. For example, a group may be a group of principals that have the same geographical location. The definition of that group of principals may include the membership of the group, the location, and other data and/or metadata associated with that group. As used herein, a principal is an entity corresponding to an identity managed by the computing resource service provider 104, where the computing resource service provider 104 manages permissions for the identity and where the entity may include one or more sub-entities, which themselves may have identities.

The identity mapping service 110 may utilize the contact information provided by the user account owner or administrator to transmit a notification to the one or more users 106 that are to be the owners or administrators of the new service provider users 112. The notification may include a link to an identity mapping service portal accessible to users 106 within the customer datacenter 102 via a federated identity. Further the notification may include a hashed key embedded within the link that may allow the users 106 to finalize the new service provider user 112 creation process. If a user 106 utilizes the link provided by the identity mapping service 110 to access the identity mapping service portal, the identity mapping service may obtain the hashed key and determine the identity of the user 106. Further, the identity mapping service 110 may prompt the user 106, through the GUI of the identity mapping service 110, to accept one or more terms of service for accessing the one or more computing resources provided by the computing resource service provider 104. The identity mapping service 110 may also transmit a request to the user 106 to create a unique service provider user username for the user account. If the user 106 provides a unique service provider user username, the identity mapping service 110 may provide the user 106 with a temporary password for the new service provider user 112 that the user 106 is to own or administer.

The identity mapping service 110, in response to receiving a unique username from the user 106, may create the new service provider user 112 and apply one or more applicable computing resource policies to the new service provider user 112 based at least in part on the group and/or role that the new service provider user 112 belongs to and/or has assumed. The new service provider user 112 may further be associated with the user account specified by the owner or administrator of the user account in its request. The new service provider user 112 may utilize the unique username and the temporary password to access the user account and any of the one or more computing resource services 114 that may provide computing resources to the service provider users 112 associated with the user account.

In an embodiment, the identity mapping service 110 tracks users 106 that request creation of new service provider users 112 for their user accounts, as well as the owners or administrators of the new service provider users 112. For instance, the identity mapping service 110 may log all metadata associated with creating a new service provider user 112, including an identity of the user 106 that requested creation of the new service provider user 112, the date and time at which the request was submitted, the user account to which the new service provider user 112 is to be added, and the like. The identity mapping service 110 may provide data logs specifying this information to a computing resource monitoring service provided by the computing resource service provider 104. The computing resource monitoring service may aggregate these logs and provide aggregated data to the owner or administrator of the customer datacenter 102 or the owner of the target user account.

In addition to creating new service provider users 112 for a user account, an administrator or owner of a user account may access the identity mapping service 110 via a federated identity to create or modify computing resource policies that may be applicable to the user account and/or specific service provider users 112 associated with the user account. For instance, through an interface provided by the identity mapping service 110, an administrator or owner of a user account may view any existing computing resource policies that have been created for the user account. Additionally, through the interface, an administrator or owner of a user account may view any enterprise (e.g., global) policies that apply to all accounts and service provider users 112 associated with the customer datacenter 102. These enterprise policies may only be modified or created by an administrator or owner of the customer datacenter 102. Thus, while an account administrator or owner may view these enterprise policies, they will not be able to modify these policies.

Through the interface provided by the identity mapping service 110, the user account owner or administrator may select an existing policy to modify, apply to a new user account, or to delete the policy. Further, through the interface, the user account owner or administrator may submit a request to create a new computing resource policy that can be applied to any of the user accounts that the user account owner or administrator maintains. Based at least in part on the requested actions, the identity mapping service 110 may determine whether any of the modifications and/or creations of user policies adhere to the enterprise policies that are applicable to the existing user accounts associated with the customer datacenter 102. For example, an enterprise policy may specify that no service provider user 112 can have the ability to directly create and/or delete an existing service provider user 112. Thus, if the user account owner or administrator creates a new policy that would enable a service provider user 112 to directly create and/or delete an existing service provider user 112, the identity mapping service 110 may deny application of the new policy. In some embodiments, if there is a conflict between a newly created policy or modified policy and an enterprise policy, the identity mapping service 110 will apply the enterprise policy and reject application of the newly created policy or modified policy.

If the identity mapping service 110 determines that the newly created policy or modified policy may be applied to the target one or more user accounts, the identity mapping service 110 may update the interface to present application of the policy to the one or more user accounts. Further, the identity mapping service 110 may access each user account affected by the creation or modification of the policy to enable application of the policy to the user account and to the corresponding service provider users 112 associated with the user account. Similar to the creation of new service provider users 112, the identity mapping service 110 may log all requested changes to the policies along with the associated metadata with the request for tracking purposes. Thus, an owner or administrator of the customer datacenter 102 may audit these logs to ensure that the appropriate policies are applied to the user accounts.

In some embodiments, a user account administrator or owner can access the identity mapping service 110 via a federated identity to remove a service provider user 112 from one or more user accounts. For instance, through the identity mapping service 110, an account administrator or owner may select the specific account that it wants to remove a service provider user 112 from. Alternatively, the account administrator or owner may select the service provider user 112 to remove the service provider user 112 from multiple accounts at once. To identify the service provider user 112, the user account administrator or owner may provide contact information for the owner or administrator of the service provider user 112. The identity mapping service 110 may use the contact information provided to identify the service provider user 112. In response to the request from the user account administrator or owner, the identity mapping service 110 may remove the identified service account user 112 from the one or more specified user accounts.

Alternatively, if the user account administrator or owner is departing from the customer organization and, thus, will no longer be a user 106 within the customer datacenter 102, the user account administrator or owner may submit a request, such as an application programming interface (API) call, to the identity mapping service 110 to remove all user accounts owned by the user 106. In response to the request, the identity mapping service 110 may determine whether the user account has been designated as a service account or a human account and take action based at least in part on the designation. For instance, the customer organization may choose to only remove human accounts owned by an internal user 106 but re-assign ownership of service accounts to a secondary account owner. If ownership of a user account is to be re-assigned to a secondary owner of the user account, the new owner of the user account may be notified by the identity mapping service 110. The new owner may be required to accept ownership of the user account and identify a new secondary owner for the account. However, if the user account is to be removed entirely, the identity mapping service 110 may terminate the user account and inform any affected service provider users 112 of the termination.

In some embodiments, a user 106 that manually creates a new user account for service provider users 112 can access the identity mapping service 110 via a federated identity to add the new user account into the identity mapping service portal for management. Alternatively, through the identity mapping service 110, the user 106 may also submit a request to create a new user account for service provider users 112. In response to the request to add the new user account to the portal for management, the identity mapping service 110 may assign the user 106 as the primary owner of this new user account. Further, the identity mapping service 110 may prompt the user 106, through an interface, to identify a secondary owner of the user account, as well as any other account administrators that the user 106 would like to assign to the user account. If the user 106 is adding the account to the identity mapping service portal for management, the identity mapping service 110 may access the user account via the credentials provided by the user 106 to ensure that the user account abides by the enterprise policies. For example, the identity mapping service 110 may evaluate the user account to determine whether there are any existing service provider users 112 associated with the user account. If so, the identity mapping service 110 may assign ownership of these existing service provider users 112 to the user account owner. Alternatively, if the user 106 submitted a request to the identity mapping service 110 to create the new user account, the identity mapping service 110 may create the new user account while ensuring that the new user account abides by these enterprise policies.

In some embodiments, the computing resource services 114 and computing resources associated with these computing resource services 114 may be provided by a service provider other than the computing resource service provider 104. For example, through the identity mapping service 110, a user 106 may provide information regarding the other one or more service providers that may provide the target computing resource services 114 and associated computing resources for which service provider users 112 for the user's account are to be created. The information may include a second SAML assertion that includes authentication information for the user 106, as well as other information about the user 106 that may be used to make access-control decisions. The identity mapping service 110 may provide this second SAML assertion to the other one or more service providers in order to access the other one or more service providers. Through the other one or more service providers, the identity mapping service 110 may perform the operations described above to create one or more service provider users 112 within the environment of the other one or more service providers, modify or create policies applicable to these users 112, and remove or add user accounts within the other one or more service providers.

Figure 2:
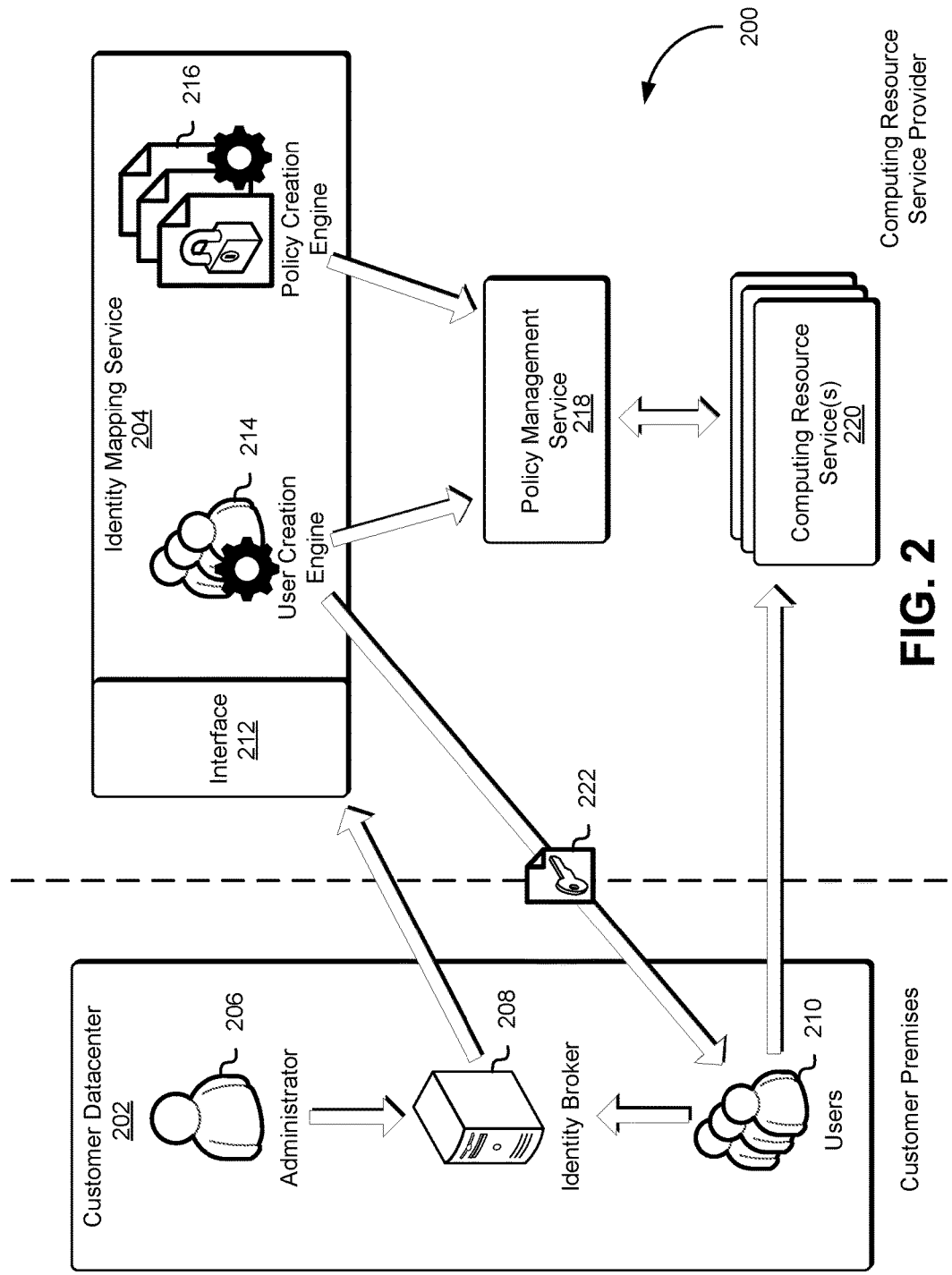
FIG. 2 shows an illustrative example of an environment in which an administrator of a computing resource service provider account utilizes an identity mapping service to configure one or more service provider users and policies applicable to the one or more service provider users in accordance with at least one embodiment.

As noted above, an administrator or owner of a customer datacenter may access, via a federated identity, an identity mapping service provided by a computing resource service provider to manage and monitor user accounts and service provider users associated with these accounts. For instance, the administrator or owner of a customer datacenter may generate one or more new service provider users that may be owned by one or more users of the customer datacenter in order to enable these users to access computing resources on behalf of the customer organization. Accordingly, FIG. 2 shows an illustrative example of an environment 200 in which an administrator 206 of a computing resource service provider account utilizes an identity mapping service 204 to configure one or more service provider users and policies applicable to the one or more service provider users in accordance with at least one embodiment.

In the environment 200, an administrator 206 of a customer datacenter 202 may access an identity broker 208 of the customer datacenter 202 for authentication. The administrator 206 may provide, to the identity broker 208, a set of credentials or other information that may be used to authenticate the administrator 206. For instance, the administrator 206 may provide a username and corresponding password or token to the identity broker 208. In response to the request for authentication, the identity broker 208 may access an identity store of the customer datacenter 202 that may include one or more user profiles for each user and administrator of the customer datacenter 202. The identity broker 208 may use the identity store to determine the administrator's role within the customer organization. For instance, the identity broker 208 may determine whether the administrator 206 is indeed an administrator or owner of the customer organization.

If the identity broker 208 is able to authenticate the administrator 206, the identity broker 208 may construct an identity assertion for the administrator 206, such as a SAML assertion, that includes authentication information for the administrator 206, as well as other information about the administrator 206 that may be used to make access-control decisions. The administrator 206 may utilize a client device or other application to access the computing resource service provider environment and the identity mapping service 204. The identity mapping service 204 may evaluate the identity assertion from the identity broker 208 and determine whether the administrator 206 may access the identity mapping service 204. Further, the identity mapping service 204 may determine, based at least in part on the identity assertion provided by the identity broker 208, whether the administrator 206 is an owner or administrator of one or more user accounts within the computing resource service provider network. For instance, the identity mapping service 204 may identify, through a policy management service 218, one or more policies that may be applicable to the administrator 206 within the computing resource service provider network. Thus, the administrator 206 may access the identity mapping service 204 via a federated identity established by the identity broker 208.

The identity mapping service 204 may include various components that may be used by the administrator 206 to manage various user accounts and service provider users within the computing resource service provider network. For instance, the identity mapping service 204 may include an interface 212 through which users of the identity mapping service 204 may interact with other components of the identity mapping service 204 and submit requests for user account management and policy management. The interface 212 may be a GUI, which may provide users of the identity mapping service 204 with a visual representation of their user accounts and policies applicable to these accounts. In an embodiment, the administrator 206 can access the identity mapping service 204 through the provided interface 212 to request creation of one or more service provider users for a user account. Through the interface 212, the administrator may interact with a user creation engine 214 of the identity mapping service 204 to configure the one or more new users for its designated user accounts. The user creation engine 214 may comprise one or more computer systems or programmatic processes of the identity mapping service 204 that may interact with a policy management service 218 to generate and manage one or more service provider users and apply any applicable policies to these users.

The user creation engine 214 may interact with the interface 212 to provide the administrator 206 with instructions for generating a new service provider user for its user accounts. For instance, in response to an administrator request to add a new service provider user to a particular account, the user creation engine 214 may prompt the administrator 206, through the interface 212, to provide contact information for the one or more internal users 210 of the customer datacenter 202 or other customer organization that may each utilize a federated identity to access the specified user accounts and assume ownership of the new service provider user. For instance, the user creation engine 214 may require that the administrator 206 provide an e-mail address for each internal user 210 who will be an owner of the new service provider user. Alternatively, the administrator 206 may provide telephone numbers, physical addresses, instant messaging identifiers, and the like to the user creation engine 214. In addition to providing the contact information for the one or more internal users 210, the administrator 206 may utilize the interface 212 to select the group to which the new service provider users will belong to and any roles that these new service provider users may assume.

In response to the request from the administrator 206, the user creation engine 214 of the identity mapping service 204 may generate a Uniform Resource Identifier (URI) link to the identity mapping service 204 that an internal user 210 may use to access the identity mapping service 204. In an embodiment, the user creation engine 214 may generate and embed a hashed key 222 into the URI link that may be used by the identity mapping service 204 to identify the internal user 210 if the internal user 210 utilizes the link to access the identity mapping service 204. In some instances, the internal user 210 may generate a claim of access to the hashed key 222 which may be provided to the identity mapping service 204. For instance, the internal user 210 may digitally sign a message that includes the hashed key 222 and provide a digital certificate that includes a public cryptographic key that may be used by the identity mapping service 204 to determine the validity of the corresponding digital signature. The user creation engine 214 may utilize the provided contact information to provide the URI link and the hashed key 222 to the internal user 210.

The internal user 210 may utilize the URI link provided by the user creation engine 214 to access the identity mapping service 204 and complete the service provider user registration process. For instance, in response to detection of an internal user 210 accessing the interface 212 via a federated identity, the user creation engine 214 may provide the internal user 210 with the terms of service for utilizing the one or more computing resource services 220 provided by the computing resource service provider. In order for the internal user 210 to utilize the new service provider user and the user account to access the one or more computing resource services 220, the internal user 210 may be required to accept the terms of service. Additionally, the internal user 210 may be required to provide a unique username for the new service provider user. The user creation engine 214 may compare the provided username to active usernames specified in a computing resource service provider user database to determine whether the specified username is available for use. If the provided username is not available, the user creation engine 214 may prompt the internal user 210, through the interface 212, to provide another username. However, if the provided username is unique and available, the user creation engine 214 may transmit a request to the policy management service 218 to generate a temporary password or other credential that the internal user 210 may use to access the new service provider user and the one or more computing resource services 220.

The user creation engine 214 may access the policy management service 218 to identify one or more policies that may be applicable to the new service provider user based at least in part on the group in which the user belong and the one or more roles that the user may assume. The user creation engine 214 may further identify, through the policy management service 218, the one or more policies that are applicable to the user account to which the new service provider user belongs. The user creation engine 214 may apply any applicable policies to the new service provider user and transmit a request to the policy management service 218 to associate these policies with the new service provider user. Thus, the internal user 210 may utilize the unique username and the temporary password to access the one or more computing resource services 220. Further, in response to such access, the one or more computing resource services 220 may obtain the policies applicable to the user 210 from the policy management service 218 and regulate access to computing resources accordingly.

In an embodiment, an administrator 206 can access the identity mapping service 204 via a federated identity to create or modify any policies that may be applicable to one or more user accounts within the computing resource service provider network. For instance, through the interface 212, the administrator 206 may access a policy creation engine 216 of the identity mapping service 204 to create or modify policies that may be applicable to the one or more user accounts managed by the administrator 206. The policy creation engine 216 may comprise one or more computer systems or programmatic processes of the identity mapping service 204 that may interact with a policy management service 218 to generate and manage one or more policies that may be applicable to service provider users and associated computing resource service provider user accounts.

Through the interface 212, the policy creation engine 216 may present the administrator 206 with existing policy templates that have already been created and which user accounts these policies have been applied to. In order to provide this information, the policy creation engine 216 may utilize the identity assertion for the administrator 206 from the identity broker 208 to identify the administrator's user accounts and the policies applicable to these user accounts. In some instances, the policy creation engine 216 may access the policy management service 218 to identify the existing policies that are applicable to the administrator's user accounts. In addition to presenting the administrator 206 with the one or more existing policies that are applicable to these user accounts, the policy creation engine 216 may present the administrator 206 with the enterprise level policies (e.g., global policies) that may also be applicable to the user accounts. These enterprise level policies may supersede any policies generated by other users of the customer datacenter 202 and may only be manipulated by an enterprise administrator.

The administrator 206 may select, through the interface 212, a policy that it would like to modify, apply to a new user account, or delete. If the administrator 206 modifies an existing policy or applies the policy to a new user account, the policy creation engine 216 may verify that the modifications to the existing policy do not conflict with the enterprise level policies and adhere to these enterprise level policies. If the policy creation engine 216 determines that these modifications do not adhere to the enterprise level policies implemented for the user accounts, the policy creation engine 216 may deny the request to implement the modifications to the policies and prompt the administrator 206, through the interface 212, to make further modifications that conform to the enterprise level policies. If the policy creation engine 216 determines that the modifications to the policies conform to the enterprise level policies, the policy creation engine 216 may access each affected user account that needs to be updated in order to implement the modifications to the policies. The policy creation engine 216 may also access the policy management service 218 to implement these modified or otherwise new policies created by the administrator 206.

In an embodiment, the identity mapping service 204 logs all requested changes to existing policies, creation of new policies, and the creation or removal of any service provider users and accounts. For instance, in response to a request from an administrator 206 to utilize the user creation engine 214 or the policy creation engine 216, the identity mapping service 204 may log the requests and any changes made to service provider users and policies through the identity mapping service 204. The identity mapping service 204 may transmit these logs to a computing resource monitoring service of the computing resource service provider, which may aggregate the logs and provide data to the enterprise level administrator or owner. This may allow the enterprise level administrator or owner to evaluate the data from the computing resource monitoring service and determine whether the user accounts are being managed appropriately.

Figure 3:
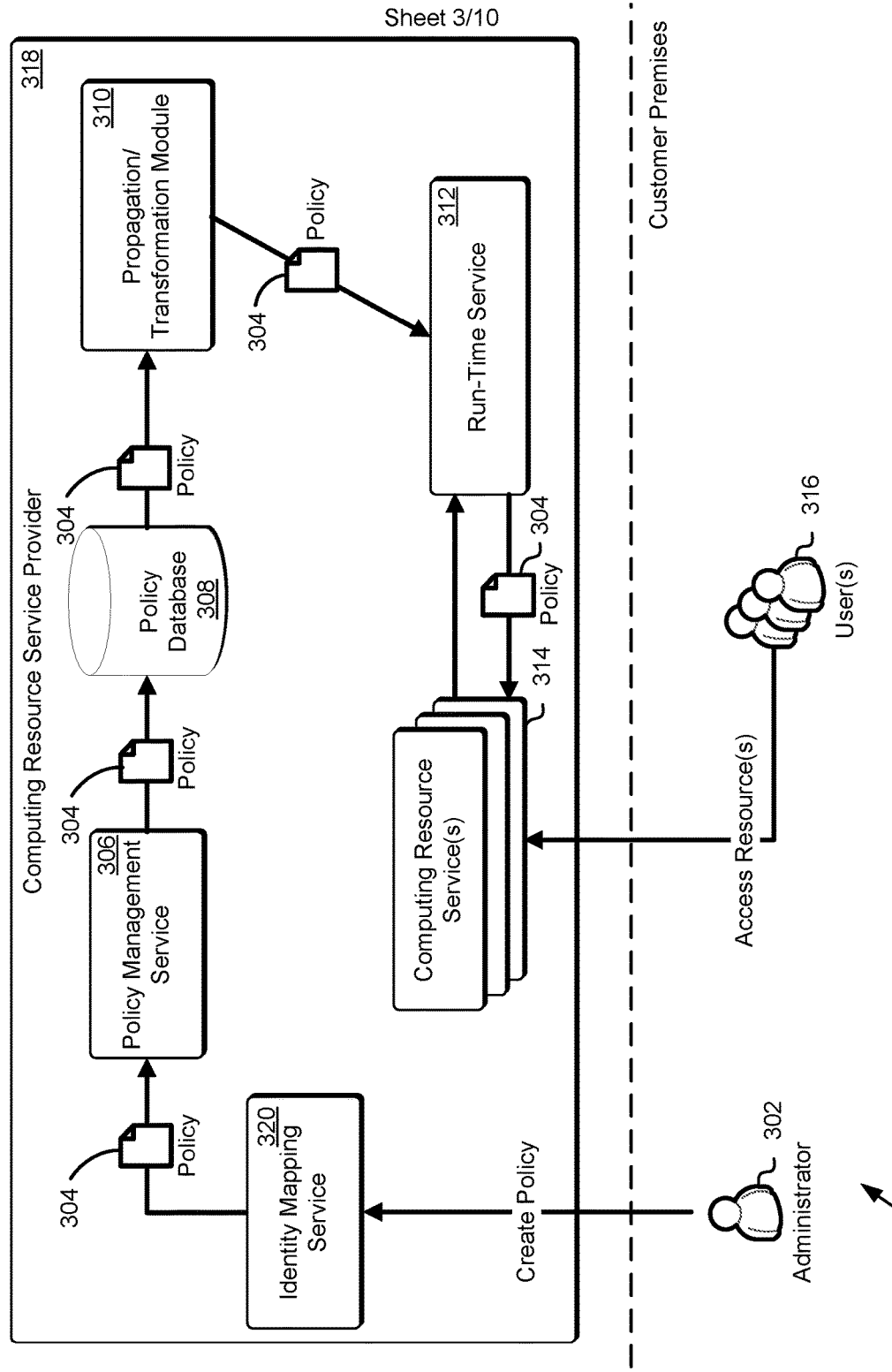
FIG. 3 shows an illustrative example of an environment in which a policy is generated and associated with one or more account users through one or more components of a computing resource service provider in accordance with at least one embodiment.

As noted above, an administrator of a customer datacenter or other administrator or owner of a user account may access an identity mapping service to generate, modify, or delete a policy that may be applicable to the user account and its corresponding service provider users. If a user accesses a computing resource service to access one or more computing resources associated with the user account, the computing resource service may utilize the applicable policy, along with other applicable policies, to determine whether the user is authorized to access the computing resource and perform the requested operations. Accordingly, FIG. 3 shows an illustrative example of an environment 300 in which a policy 304 is generated and associated with one or more account users through one or more components of a computing resource service provider 318 in accordance with at least one embodiment.

In the environment 300, an administrator 302 of a customer datacenter (e.g., enterprise or customer organization) or other administrator or owner of a user account of the computing resource service provider 318 accesses, via a federated identity, an identity mapping service 320 to create a new policy that may be applicable to the user account. The identity mapping service 320 may obtain, from the policy management service 306, one or more enterprise level policies applicable to the specified user account to determine whether the new policy would conflict with the one or more enterprise level policies. If there is a conflict, the identity mapping service 320 may deny the request and prompt the administrator 302 to modify the policy to conform to the enterprise level policies.

The identity mapping service 320 may transmit the parameters of the new policy to the policy management service 306, which may generate the policy 304 and store the policy within a policy database 308. The policy database 308 may be a relational database that may be used to store the policy 304. For instance, the policy database 308 may be used to store metadata about the policy 304 (e.g., name of the policy 304, a policy owner identifier, when the policy 304 was generated, current version of the policy 304, etc.). The policy database 308 may include an additional relational database table corresponding to the various users and accounts associated with the computing resource service provider 318. This table may specify user and account metadata, such as identifiers for the users and accounts, contact information, associated resources, and the like. The policy database 308 may also include another relational database table corresponding to the attachment or association of a user or account to a particular policy 304.

Once the policy 304 has been generated by the policy management service 306 through use of the policy database 308, a propagation/transformation module 310 may obtain information regarding the policy 304 or the policy 304 itself from the policy database 308. The propagation/transformation module 310 may be a computer system of the policy management service 306, a separate computer system of the computing resource service provider 318, or one or more applications associated with either of these computer systems, that is configured to transform data from the policy database 308 into data that may be stored within a run-time database which is stored within a key-value store that exists on each physical host and that may be accessed by a run-time service 312. For instance, the propagation/transformation module 310 may store each policy 304 as a unique identifier within the run-time database. This unique identifier may serve as the key in the key-value store. The propagation/transformation module 310 may further store in the run-time database a mapping of user identifiers associated with the users 316 to a policy identifier.

The information collected by the propagation/transformation module 310 may be transmitted to a run-time service 312, which may include one or more computer systems configured to be responsible for delivering run-time policies to the individual computing resource services 314 as these computing resource services 314 submit requests to determine whether a particular user is authorized to perform one or more actions through these services 314. For instance, in response to a request from a user 316 to access a particular resource of a computing resource service 314, the computing resource service 314 may transmit a request to the run-time service 312 to identify any policies 304 that may be applicable to the account that the user 316 is a part of. The run-time service 312 may respond to the requesting computing resource service 314 by providing the one or more identified policies 304 to the requesting computing resource service 314. In some embodiments, the relevant policies can be cached within each of the computing resource services 314 as they are received. If any of the relevant policies are not cached, the computing resource service 314 may transmit another request to the run-time service 312 to obtain the needed policies to determine whether the user 316 is authorized to perform the requested actions.

In response to the request, the run-time service 312 may access the run-time database to identify the policies 304 that are applicable to the user 316. Further, the run-time service 312 may transmit a request to the propagation/transformation module 310 to obtain the identified policies 304. The propagation/transformation module 310 may obtain the relevant policies 304 from the policy database 308 and provide the policies 304 to the run-time service 312 to fulfill the request. The run-time service 312, in turn, may provide the policies 304 to the computing resource service 314, which may store the policies 304 in its cache. The computing resource service 314 may utilize metadata or other information included in the user's request to populate any fields in the policies 304 that may include one or more wildcard or modifiable characters. For instance, the computing resource service 314 may populate the policy with a user identifier and an identifier of the account of the user 316. The computing resource service 314 may utilize these updated policies 304 to determine whether the user may perform the one or more requested actions on the targeted computing resource. The computing resource service 314 may maintain the cache with the different policies 304 as well as a separate cache that may include a mapping of user identifiers to the corresponding policies 304 that are applicable to the user 316. Thus, when a new user request is received, the computing resource service 314 may identify the appropriate policies and update the policies based at least in part on the user's identifier and the identifier of the account of the user.

Figure 4:
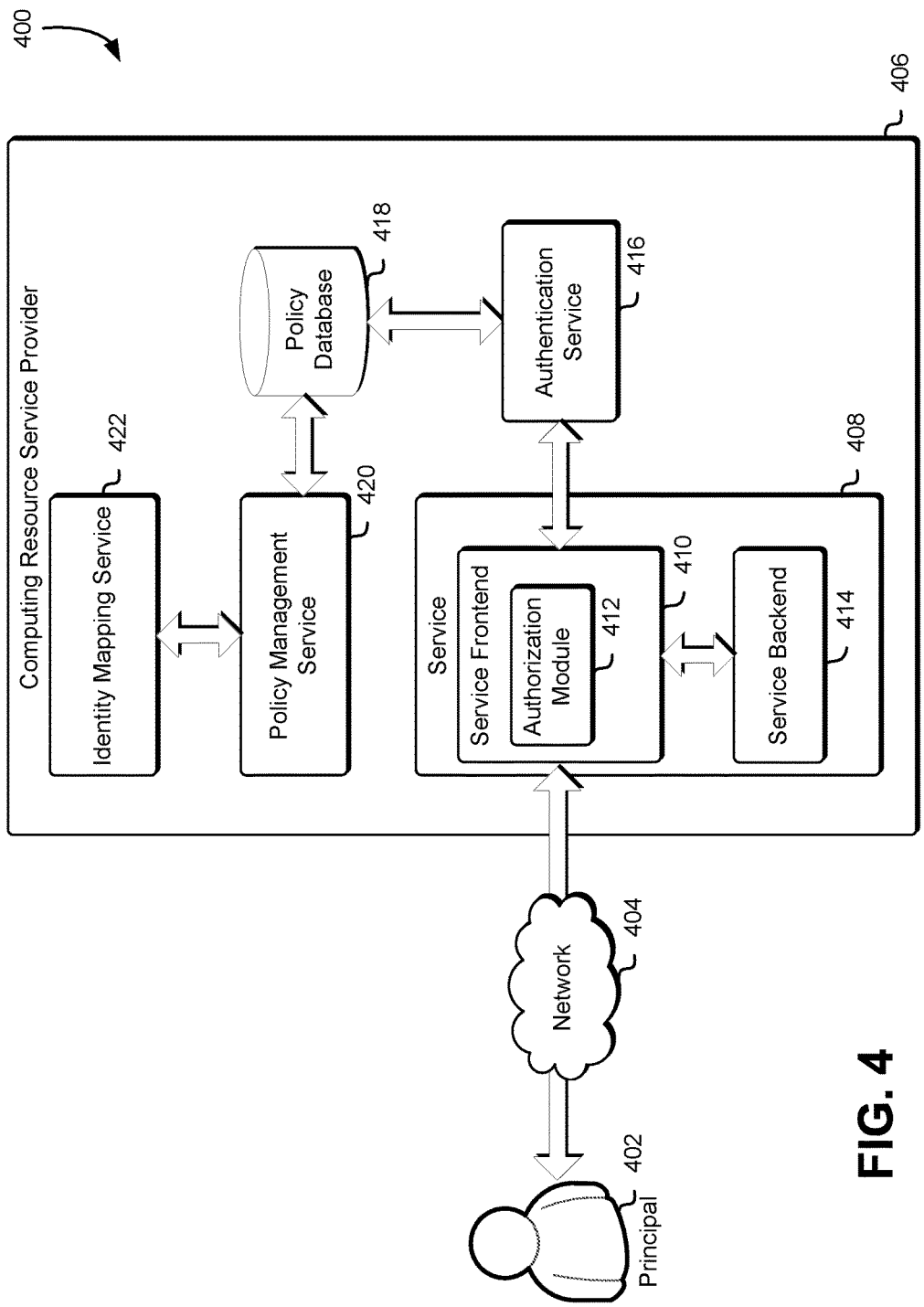
FIG. 4 shows an illustrative example of an environment in which computing resource policies may be managed for one or more federated users in accordance with at least one embodiment.

FIG. 4 shows an illustrative example of an environment 400 in which computing resource policies may be managed for one or more users in accordance with at least one embodiment. In an embodiment, a principal 402 may use a computing device to communicate over a network 404 with a computing resource service provider 406. Communications between the computing resource service provider 406 and the principal 402 may, for instance, be for the purpose of accessing a service 408 operated by the computing resource service provider 406, which may be one of many services operated by the computing resource service provider 406. The service 408 may comprise a service frontend 410 and a service backend 414. The principal 402 may issue a request for access to a service 408 (and/or a request for access to resources associated with the service 408) provided by a computing resource service provider 406. The request may be, for instance, a web service application programming interface request. The principal may be a user, or a group of users, or a role associated with a group of users, or a process representing one or more of these entities that may be running on one or more remote (relative to the computing resource service provider 406) computer systems, or may be some other such computer system entity, user, or process. Each user, group, role, or other such collection of principals may have a corresponding user definition, group definition, role definition, or other definition that defines the attributes and/or membership of that collection. For example, a group may be a group of principals that have the same geographical location. The definition of that group of principals may include the membership of the group, the location, and other data and/or metadata associated with that group. As used herein, a principal is an entity corresponding to an identity managed by the computing resource service provider, where the computing resource service provider manages permissions for the identity and where the entity may include one or more sub-entities, which themselves may have identities.

The principal 402 may communicate with the computing resource service provider 406 via one or more connections (e.g., transmission control protocol (TCP) connections). The principal 402 may use a computer system client device to connect to the computing resource service provider 406. The client device may include any device that is capable of connecting with a computer system via a network, such as example devices discussed below. The network 404 may include, for example, the Internet or another network or combination of networks discussed below.

The computing resource service provider 406, through the service 408, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources, and/or storage resources. In some examples, the resources associated with the computer services may be physical devices, virtual devices, combinations of physical and/or virtual devices, or other such device embodiments.

The request for access to the service 408 may be received by a service frontend 410, which, in some examples, comprises a web server configured to receive such requests and to process them according to one or more policies associated with the service 408. The request for access to the service 408 may be a digitally signed request and, as a result, may be provided with a digital signature. The service frontend 410 may then send the request and the digital signature for verification to an authentication service 416. The authentication service 416 may be a stand-alone service or may be part of a service provider or other entity. The authentication service 416, in an embodiment, is a computer system configured to perform operations involved in authentication of principals. In some examples, requests submitted to the service frontend 410 are digitally signed by the principal (i.e., by a computing device used by or operating on behalf of the principal) using a symmetric cryptographic key that is shared between the principal 202 and the authentication service 416. The authentication service, therefore, may use a copy of the symmetric cryptographic key to verify digital signatures of requests purported to have been generated by the principal 402. However, in other embodiments, the authentication service 416 may be configured to utilize asymmetric cryptography for digital signature verification such as, for example, in response to the principal digitally signing requests using a private cryptographic key. In such embodiments, the authentication service may be configured to trust a certificate authority that digitally signed a certificate of the principal 402 corresponding to the private cryptographic key. Consequently, in some embodiments, the authentication service may use a public cryptographic key specified by the certificate.

Upon successful authentication of a request, the authentication service 416 may then obtain policies applicable to the request. A policy may be applicable to the request by way of being associated with the principal 402, a resource to be accessed as part of fulfillment of the request, a group in which the principal 402 is a member, a role the principal 402 has assumed, and/or otherwise. To obtain policies applicable to the request, the authentication service 416 may transmit a query to a policy database 418 managed by a policy management service 420, which may be the policy management service discussed above in connection with FIG. 3. The policy management service 420 may also determine the policy version associated with the policy by transmitting a query to the policy database 418.

In an embodiment, an administrator of a user account to which the principal 402 is associated, can access, via a federated identity, an identity mapping service 422 to generate one or more service provider users that may access the user account and/or to generate policies that may be applicable to the user account and its users. For instance, the user creation engine of the identity mapping service 422 may access the policy management service 420 to identify one or more policies that may be applicable to a new service provider user based at least in part on the group in which the user belong and the one or more roles that the user may assume. The user creation engine may further identify, through the policy management service 420, the one or more policies that are applicable to the user account to which the new service provider user belongs. The user creation engine may apply any applicable policies to the new service provider user and transmit a request to the policy management service 420 to associate these policies with the new service provider user.

Additionally, an administrator may modify an existing policy or apply a policy to a new user account. In response to such modification or application of the policy, the identity mapping service 422 may verify that the modifications to the existing policy do not conflict with the enterprise level policies and adhere to these enterprise level policies. If the identity mapping service 422 determines that these modifications do not adhere to the enterprise level policies implemented for the user accounts, the identity mapping service 422 may deny the request to implement the modifications to the policies and prompt the administrator to make further modifications that conform to the enterprise level policies. If the identity mapping service 422 determines that the modifications to the policies conform to the enterprise level policies, the identity mapping service 422 may access each affected user account that needs to be updated in order to implement the modifications to the policies. The identity mapping service 422 may also access the policy management service 420 to implement these modified or otherwise new policies created by the administrator.

The query to the policy database 418 may be a request comprising information sufficient to determine a set of policies applicable to the request and the associated version for each policy of this set of policies. The query to the policy database may, for instance, contain a copy of the request and/or contain parameters based at least in part on information in the request, such as information identifying the principal, the resource, and/or an action (operation to be performed as part of fulfillment of the request). The policy database 418 may be a database or other system operable to process queries. The policy database 418 may process queries by providing records and/or other such data applicable to the request and/or responsive to the queries. Note that, if authentication of the request is unsuccessful (e.g., because a digital signature could not be verified), policies applicable to the request and/or usage data associated with the policy may not be provided to the requester.

Having obtained any policies applicable to the request, the authentication service 416 may provide an authentication response and, if applicable, the obtained policies back to the service frontend 410. The authentication response may indicate whether the response was successfully authenticated. The service frontend 410 may then check whether the fulfillment of the request for access to the service 408 would comply with the obtained policies using an authorization module 412. An authorization module 412 may be a process executing on the service frontend that is operable to compare the request to the one or more permissions in the policy to determine whether service may satisfy the request (i.e., whether fulfillment of the request is authorized). For example, the authorization module may compare an API call associated with the request against permitted API calls specified by the policy to determine if the request is allowed. If the authorization module 412 is not able to match the request to a permission specified by the policy, the authorization module 412 may execute one or more default actions such as, for example, providing a message to the service frontend that causes the service frontend to deny the request, and causing the denied request to be logged in the policy management service 420. If the authorization matches the request to one or more permissions specified by the policy, the authorization module 412 may resolve this by selecting the least restrictive response (as defined by the policy) and by informing the service frontend whether the fulfillment of the request is authorized (i.e., complies with applicable policy) based on that selected response. The authorization module 412 may also by select the most restrictive response or may select some other such response and inform the service frontend whether the fulfillment of the request is authorized based on that selected response. Note that, while FIG. 4 shows the authorization module 412 as a component of the service frontend 410, in some embodiments, the authorization module 412 is a separate service provided by the computing resource service provider 406 and the frontend service may communicate with the authorization module 412 over a network.

Finally, if the fulfillment of the request for access to the service 408 complies with the applicable obtained policies, the service frontend 410 may fulfill the request using the service backend 414. A service backend 414 may be a component of the service configured to receive authorized requests from the service frontend 410 and configured to fulfill such requests. The service frontend 410 may, for instance, submit a request to the service backend to cause the service backend 414 to perform one or more operations involved in fulfilling the request. In some examples, the service backend 414 provides data back to the service frontend 410 that the service frontend provides in response to the request from the principal 402. In some embodiments, a response to the principal 402 can be provided from the service frontend4 indicating whether the request was allowed or denied and, if allowed, one or more results of the request.

Figure 5:
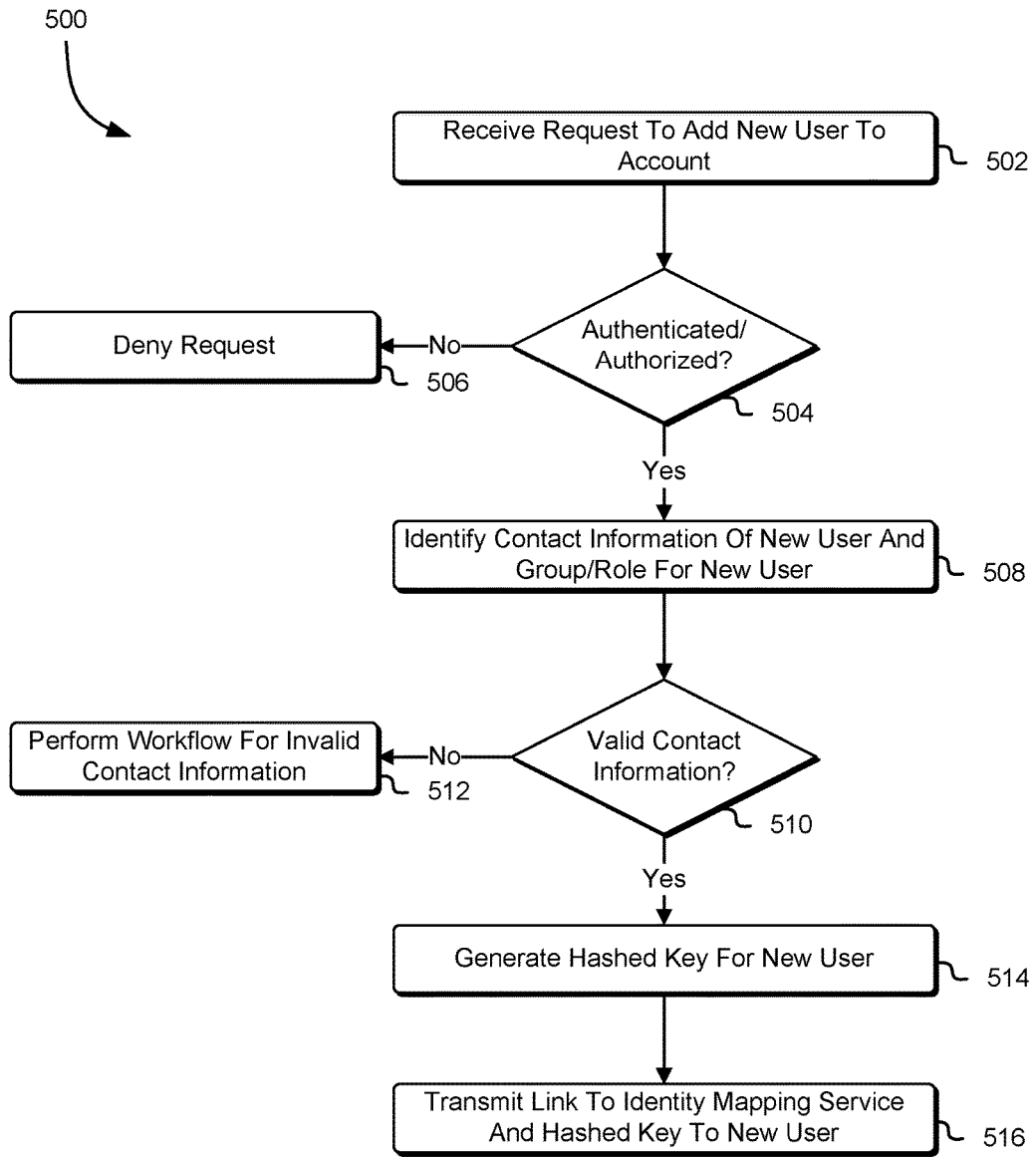
FIG. 5 shows an illustrative example of a process for registering a new service provider user based at least in part on a request from an administrator of computing resource service provider account in accordance with at least one embodiment.

As noted above, an administrator or owner of a user account may access the identity mapping service via a federated identity to create one or more service provider users that may access the user account. Through the identity mapping service, the administrator or owner of the user account may provide contact information for the one or more users that are to own the service provider users for the user account. This contact information may be specific to the external (in relation to the computing resource service provider network) customer network, as the one or more users may access the user account and the identity mapping service via federated identities as well. Accordingly, FIG. 5 shows an illustrative example of a process 500 for registering a new service provider user based at least in part on a request from an administrator of a computing resource service provider account in accordance with at least one embodiment. The process 500 may be performed by the identity mapping service, which may provide a portal through which administrators and owners of user accounts may utilize a federated identity to access. Further, the identity mapping service may interact with other users to enable these users to register their identity with the identity mapping service.

At any time, the identity mapping service may receive 502 a request from an administrator or owner of a user account to add a new service provider user to the user account. For instance, the identity mapping service may evaluate an identity assertion from the identity broker within the customer datacenter or other external customer network and determine whether the administrator or owner may access the identity mapping service. Further, the identity mapping service may identify, through a policy management service, one or more policies that may be applicable to the administrator or owner of the user account within the computing resource service provider network. The policy management service or the identity mapping service may maintain a mapping of users within the customer datacenter to different roles within the computing resource service provider network. Thus, the identity mapping service may utilize the identity assertion from the identity broker to assign a role to the administrator or owner of the user account based at least in part on the mapping. This may enable the administrator or owner of the user account to access the identity mapping service via a federated identity. Further, the identity mapping service may utilize this identity assertion to determine 504 whether the administrator or owner has been properly authenticated by the identity broker and is authorized to add users to the user account. If the administrator or owner is not properly authenticated and/or is not authorized to add users to the user account, the identity mapping service may deny 506 the request.

If the administrator or owner of the user account is authorized to add one or more new service account users to the user account, the identity mapping service may identify 508 contact information for each of the new users that are to be added to the user account, as well as information that can be used to determine what group each new user will belong to and which role each new user is to assume. For instance, the identity mapping service may transmit a request to the administrator or owner of the user account to provide contact information for the one or more users within the customer datacenter or organization that will be the owner of the one or more service provider users. The identity mapping service may require that the owner or administrator provide an e-mail address of a user that will be an owner of a service provider user. Alternatively, the administrator or owner of the user account may provide a telephone number, physical mailing address, instant messaging information, and the like for each user that will serve as an owner of a new service account user. In addition to the contact information for the one or more users, the owner or administrator of a user account may use the interface of the identity mapping service to select the group that the new service provider user is going to belong to and the one or more roles that the new service provider user may assume. The assignment of groups and roles may be used to determine which computing resource policies may be applicable to these new service provider users.

The identity mapping service may utilize the provided contact information for the one or more owners of the new service account users to determine 510 whether the contact information is valid. For instance, the identity mapping service may use the provided contact information to transmit a notification to each owner of a new service account user to indicate that they have been assigned to own the new service account user. If the identity mapping service receives an indication that the notification could not be delivered or that the recipient of the notification had received the notification in error, the identity mapping service may perform 512 a workflow for invalid contact information. This may include transmitting a notification to the user account owner or administrator to provide correct contact information for an owner of the new service account user. Alternatively, the identity mapping service may deny the request to add the new service account user.

If the provided contact information is valid, the identity mapping service may generate 514 a hashed key for each owner of the new service provider user such that the identity mapping service may embed the hashed key within a link that may allow each owner to access the identity mapping service. The hashed key may be used by the identity mapping service to identify the internal user (e.g., owner of the new service account user) if the internal user utilizes the link to access the identity mapping service. In some instances, the internal user may generate a claim of access to the hashed key which may be provided to the identity mapping service. For instance, the internal user may digitally sign a message that includes the hashed key and provide a digital certificate that includes a public cryptographic key that may be used by the identity mapping service to determine the validity of the corresponding digital signature. The identity mapping service may utilize the provided contact information to transmit 516 the URI link and the hashed key to the internal user.

Figure 6:
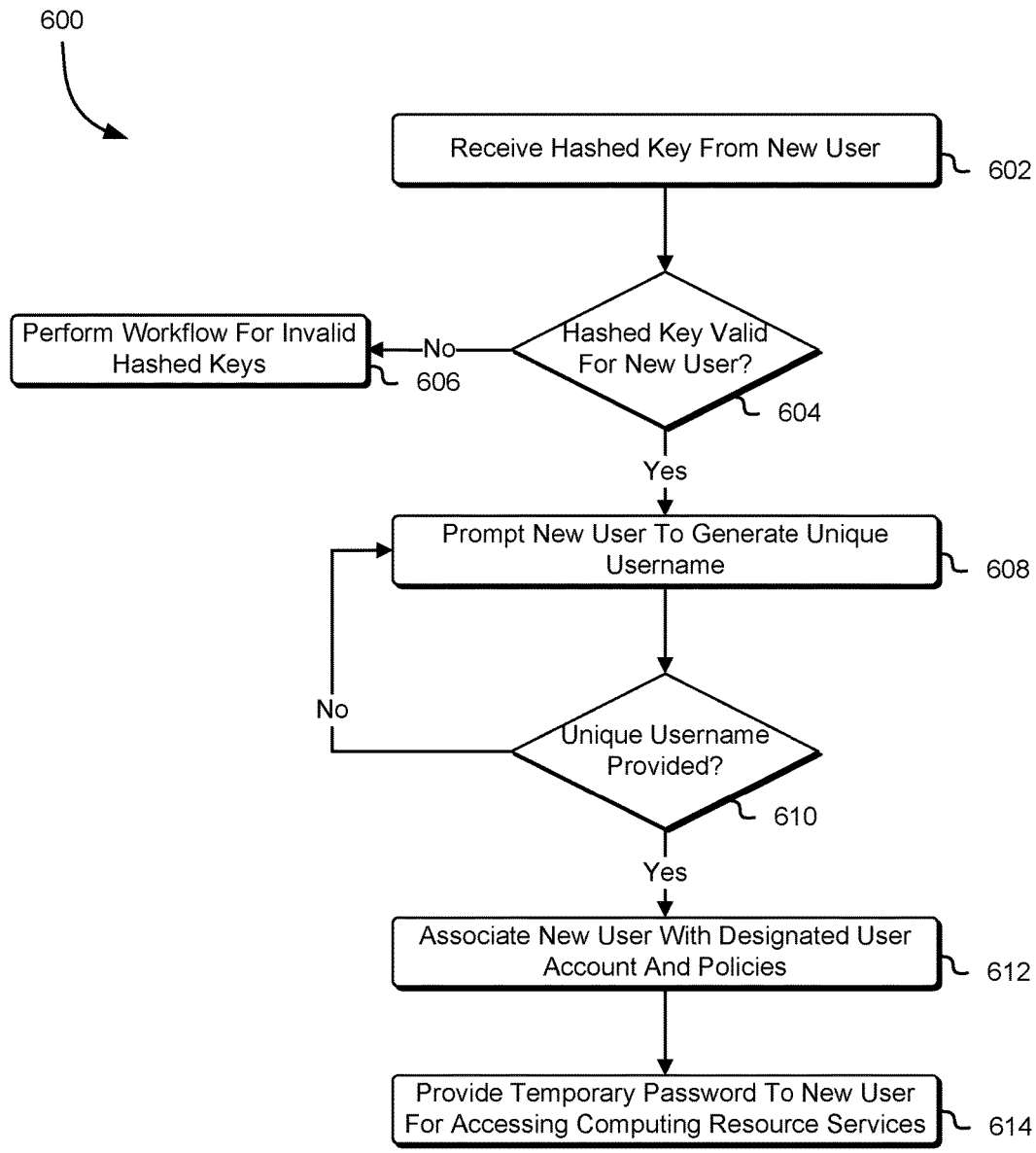
FIG. 6 shows an illustrative example of a process for enabling a federated user to access computing resource services through a computing resource service provider account in accordance with at least one embodiment.

In an embodiment, the owner of a new service provider user receives the notification from the identity mapping service and uses the link provided in the notification to access the identity mapping service. The identity mapping service may utilize an assertion of the hashed key embedded in the used link, and the identity assertion for the owner of the new service provider user, to identify the owner of the new service account user and to continue registration of the new service provider user. Accordingly, FIG. 6 shows an illustrative example of a process 600 for enabling a federated user to access computing resource services through a computing resource service provider account in accordance with at least one embodiment. The process 600 may be performed by the aforementioned identity mapping service.

At any time after providing the URI link with the embedded hashed key to an owner of a new service provider user, the identity mapping service may receive 602 the hashed key from the owner of the new service provider user through its request to access the identity mapping service. In some instances, the owner of the new service provider user may generate a claim of access to the hashed key which may be provided to the identity mapping service. For instance, the owner of the new service provider user may digitally sign a message that includes the hashed key and provide a digital certificate that includes a public cryptographic key that may be used by the identity mapping service to determine the validity of the corresponding digital signature. The identity mapping service may evaluate the hashed key or the claim of access to the hashed key to determine 604 whether the hashed key is valid for the owner of the new service provider user.

If the identity mapping service determines that the provided hashed key is invalid, the identity mapping service may perform 606 a workflow for invalid hashed keys. For example, the identity mapping service may terminate the communications session with the owner of the new service provider user and transmit a notification to the administrator or owner of the user account concerning the declined request for access to the identity mapping service. Additionally, or alternatively, the identity mapping service may notify the owner of the new service provider user that the provided hashed key is invalid and/or does not correspond with the identity assertion for the owner of the new service provider user.

If the owner of the new service provider user has provided a valid hashed key as embedded in the link used to access the identity mapping service, the identity mapping service may prompt 608, through a GUI, the owner of the new service provider user to generate a unique username for the new service provider user. The identity mapping service may compare the provided username to active usernames specified in a computing resource service provider user database to determine 610 whether the specified username is available for use. If the provided username is not available, the identity mapping service may prompt the owner of the new service provider user, through the GUI, to provide another username. However, if the provided username is unique and available, the identity mapping service may transmit a request to the policy management service to generate a temporary password or other credential that the owner of the new service provider user may use to access the new service provider user and the one or more computing resource services.

The identity mapping service may associate 612 the new service provider user with the designated user account and the one or more policies corresponding to the groups the service provider user belongs to and to the roles that the service provider user may assume. For instance, the identity mapping service may access the policy management service to identify one or more policies that may be applicable to a new service provider user based at least in part on the group in which the user belongs and the one or more roles that the user may assume. The identity mapping service may further identify, through the policy management service, the one or more policies that are applicable to the user account to which the new service provider user belongs. The user creation engine may apply any applicable policies to the new service provider user and transmit a request to the policy management service to associate these policies with the new service provider user. The identity mapping service may also provide 614 the owner of the new service provider user with a temporary password that the owner of the new service provider user may use to access the various computing resources provided by the computing resource service provider. If the owner of the new service provider user uses this temporary password to access the computing resources, it may be prompted to provide a permanent password for the service provider user.

Figure 7:
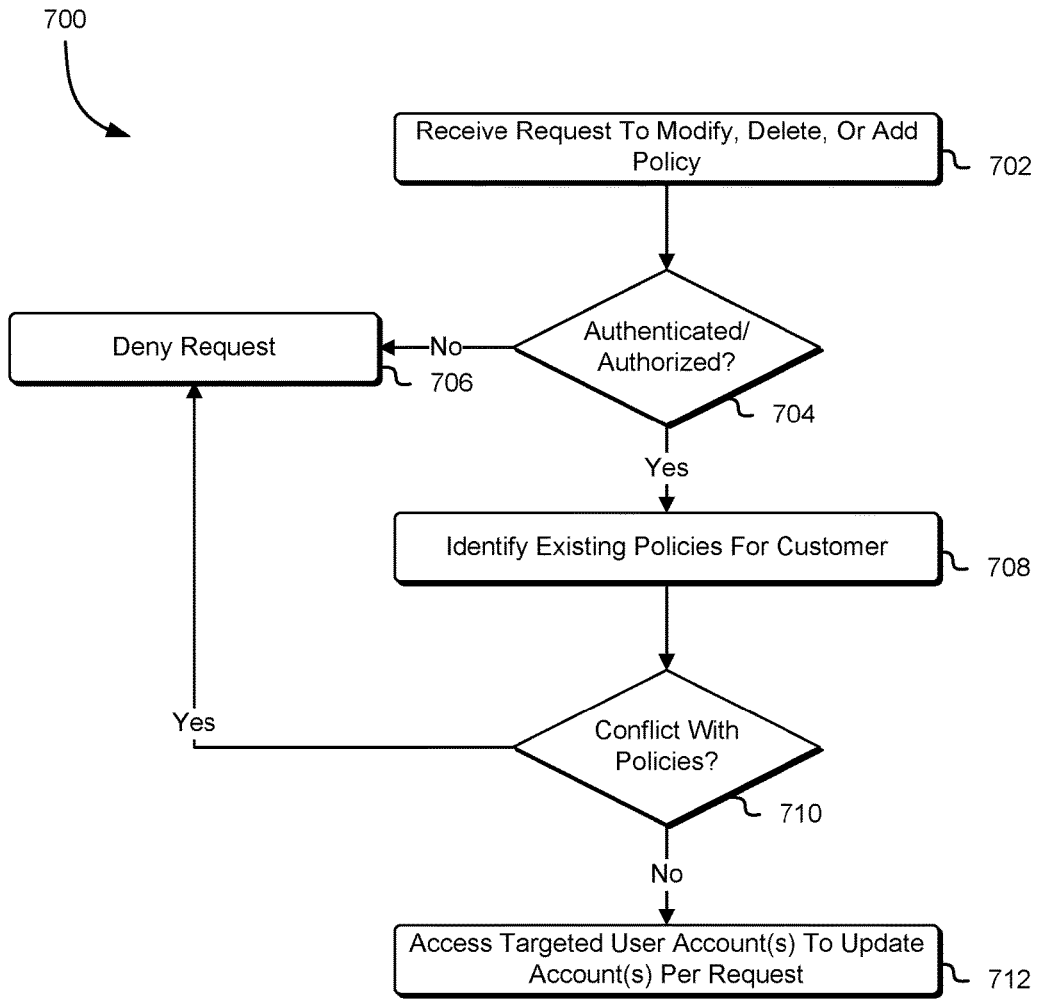
FIG. 7 shows an illustrative example of a process for modifying, deleting, or adding a policy applicable to a computing resource service provider account in response to a request from an account administrator using a federated identity in accordance with at least one embodiment.

As noted above, an administrator or owner of a user account may access the identity mapping service via a federated identity to create or modify one or more policies that may be applicable to the user account and any corresponding service provider users. Accordingly, FIG. 7 shows an illustrative example of a process 700 for modifying, deleting, or adding a policy applicable to a computing resource service provider account in response to a request from an account administrator using a federated identity in accordance with at least one embodiment. The process 700 may be performed by the identity mapping service through a policy creation engine of the service.

In an embodiment, the identity mapping service receives 702 a request to modify, delete, or add a policy from an administrator or owner of a user account via a federated identity. In response to the request, the identity mapping service may update an interface used by the administrator or owner of the user account to illustrate any existing computing resource policies that have been created for the user account. Through the interface, the administrator or owner of the user account may select the existing computing resource policy that it would like to modify or delete. Alternatively, if the administrator or owner of the user account wishes to create a new policy that may be applied to the user account and/or its users, the administrator or owner of the user account may utilize the interface to select an option to create a new policy. Through this option, the administrator or owner of the user account may select the user account to which the policy will be applied and/or specific users to which the policy will be applied.

In response to the request, the identity mapping service may determine 704 whether the administrator or owner of the user account has been authenticated by its identity broker and is authorized to modify, delete, or add policies for the user account. For instance, the identity mapping service may evaluate an identity assertion from the identity broker within the customer datacenter or other external customer network and determine whether the administrator or owner may access the identity mapping service. Further, the identity mapping service may identify, through a policy management service, one or more policies that may be applicable to the administrator or owner of the user account within the computing resource service provider network. If the administrator or owner of the user account has not been authenticated or is not authorized to modify, delete, or add policies for the user account, the identity mapping service may deny 706 its request.

If the administrator or owner of the user account is authorized to modify, delete, or add policies for the user account, the identity mapping service may identify 708 one or more existing global policies for the customer datacenter or organization. For instance, the identity mapping service may interact with the policy management service to identify the policies for the user account established by an administrator or owner of the customer organization. Through the interface, an administrator or owner of a user account may view these global policies that apply to all accounts and service provider users associated with the customer organization and any other policies that may applicable to the specified user account. These enterprise policies may only be modified or created by an administrator or owner of the customer organization. Thus, while an account administrator or owner may view these enterprise policies, they may not be able to modify these policies. However, the administrator or owner of the user account may be able to modify any other policies that may be applicable to the user account.

Based at least in part on the request and the one or more global policies identified by the identity mapping service, the identity mapping service may determine 710 whether there is a conflict with the existing policies for the user account. If the modified or added user policy conflicts with any of the existing global policies, the identity mapping service may deny 706 the request. In an embodiment, instead of denying the request, the identity mapping service applies one or more conflict resolution processes for application of the policy. For instance, the identity mapping service may resolve this conflict by selecting the least restrictive response (as defined by the policies) and by determining how fulfillment of the request is accomplished based on that selected response. The identity mapping service may also select the most restrictive response or may select some other such response to determine whether the fulfillment of the request is authorized based on that selected response.

In an embodiment, if the administrator or owner of a user account has requested modification, deletion, or addition of a new global policy for the user account, the identity mapping service can further determine whether the global policy conflicts with not only other global policies applicable to the user account, but also any other policies that may be specific to users of the user account and to the user account itself. For instance, if the administrator or owner of a user account submits a request to add a new global policy for its accounts, the identity mapping service may determine 710 whether the new global policy conflicts with any existing global policies and other policies that may be applicable to the user accounts to which the new global policy would be applicable. If the new global policy conflicts with any existing global policies, the identity mapping service may perform various operations. For instance, the identity mapping service may deny 706 the request to implement the new global policy. Alternatively, the identity mapping service may apply one or more conflict resolution rules to determine whether to apply the global policy. As an example, the identity mapping service can implement the global policy such that if the global policy conflicts with any other policies applicable to a particular account, the global policy may supersede these other policies. Further, if the new global policy conflicts with other global policies, the identity mapping service may select the most restrictive response or may select some other such response to determine whether the fulfillment of the request is authorized based on that selected response.

If the requested action does not conflict with any of the global policies applicable to the user accounts impacted by the modification, deletion, or addition of the user account policy, the identity mapping service may access 712 the targeted user accounts to update the accounts per the request. For instance, the identity mapping service may access each user account affected by the creation or modification of the policy to enable application of the policy to the user account and to the corresponding service provider users associated with the user account. The identity mapping service may log all requested changes to the policies along with the associated metadata with the request for tracking purposes. Thus, an owner or administrator of the customer datacenter may audit these logs to ensure that the appropriate policies are applied to the user accounts.

Figure 8:
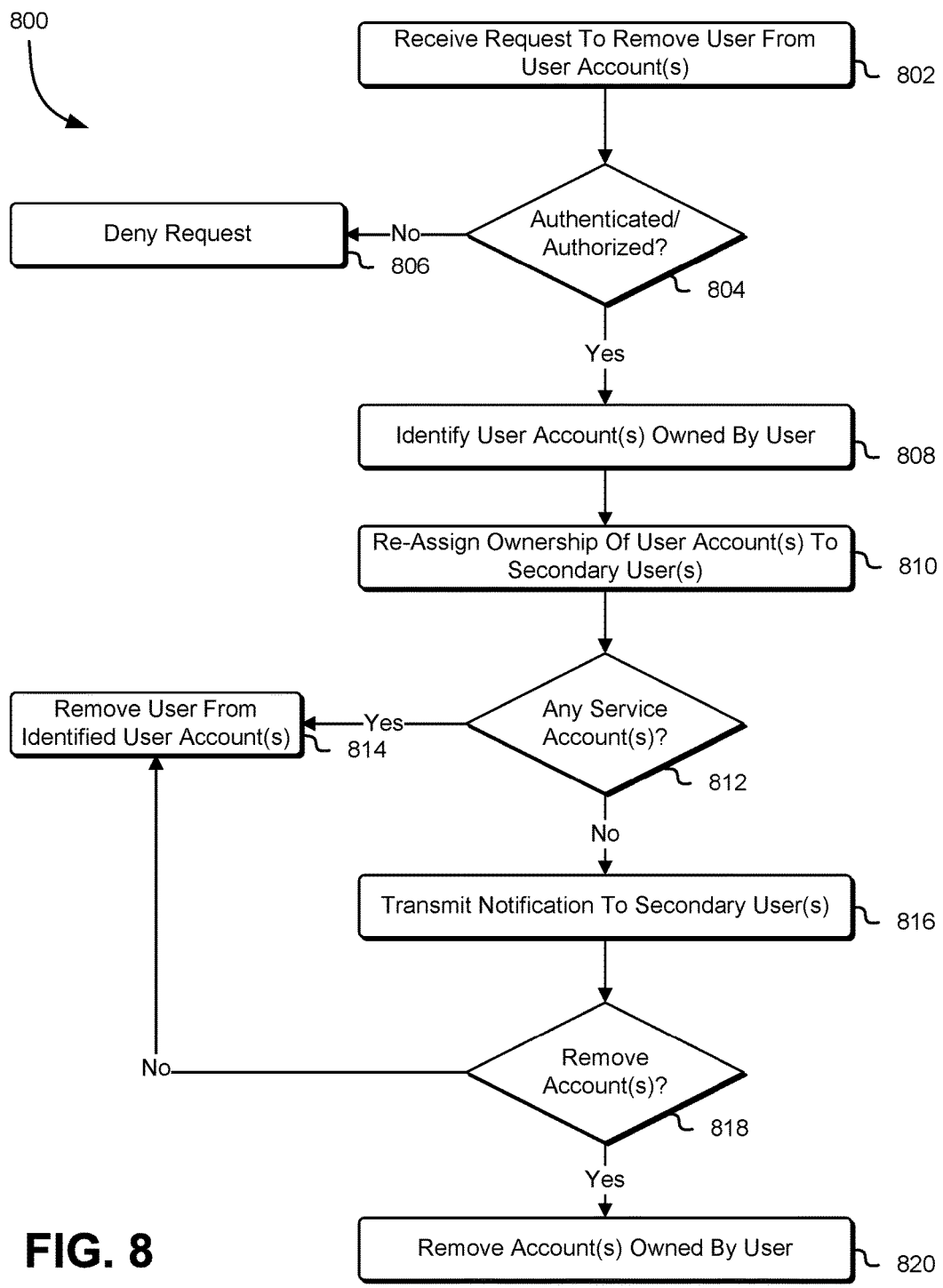
FIG. 8 shows an illustrative example of a process for removing a service provider user from one or more computing resource service provider accounts in response to a request from an account administrator using a federated identity in accordance with at least one embodiment.

As noted above, an administrator or owner of a computing resource service provider user account may submit a request to the identity mapping service, via a federated identity, to remove one or more service provider users from the user account. In some embodiments, if the administrator or owner of the user account is departing from the customer organization, a specific API call may be submitted to remove all user accounts administered by the administrator or owner of the user account. Accordingly, FIG. 8 shows an illustrative example of a process 800 for removing a service provider user from one or more computing resource service provider accounts in response to a request from an account administrator using a federated identity in accordance with at least one embodiment. The process 800 may be performed by the identity mapping service in response to requests from administrators and owners of user accounts.

In an embodiment, an administrator or owner of a user account accesses the portal for the identity mapping service via a federated identity. Through the portal, the administrator or owner of the user account may select the specific account that it would like to remove a service provider user from. Alternatively, the administrator or owner of the user account may select, from the portal, the service provider user that it would like removed from the user account and any other user account owned or administered by the administrator or owner. Thus, through the portal, the identity mapping service may receive 802 a request to remove a service provider user from one or more user accounts.

In response to the request, the identity mapping service may determine 804 whether the administrator or owner of the one or more user accounts has been authenticated by its identity broker and is authorized to remove service provider users from the user accounts. For instance, the identity mapping service may evaluate an identity assertion from the identity broker within the customer datacenter or other external customer network and determine whether the administrator or owner may access the identity mapping service. Further, the identity mapping service may identify, through a policy management service, one or more policies that may be applicable to the administrator or owner of the one or more user accounts within the computing resource service provider network. If the administrator or owner of the user account has not been authenticated or is not authorized to remove service provider users from the one or more user accounts, the identity mapping service may deny 806 its request.

If the administrator or owner of the one or more user accounts is authorized to remove service provider users from these one or more user accounts, the identity mapping service may identify 808 any user accounts that are owned by the service provider user. For instance, if the service provider user is owned by an entity that is departing from the customer organization, the administrator or owner of the customer datacenter to which the entity is a member of may identify a secondary owner that may be assigned to the user account as a new owner and to determine actions to be performed with regard to the account. Alternatively, if the entity owns any accounts that are designated as service accounts, a secondary owner of the account may need to be notified to assume ownership of the service account. Thus, the identity mapping service may re-assign 810 ownership of the one or more user accounts to secondary account owners.

In addition to re-assigning ownership of the target user accounts to secondary account owners, the identity mapping service may determine 812 whether any of the target user accounts have been categorized as service accounts. If any of the identified user accounts owned by the service account user are not service accounts, the identity mapping service may access the one or more service accounts to identify the primary and secondary owners of the service accounts and contact information for these owners. In some instances, the identity mapping service may transmit a request to an administrator or owner of the customer organization to identify the secondary owners of the one or more service accounts identified by the identity mapping service. Using the contact information obtained for the one or more secondary owners of the accounts, the identity mapping service may transmit 816 a notification to each of these secondary owners indicating the change in ownership for the one or more accounts. Additionally, the identity mapping service, through the notification, may require that the one or more secondary owners accept ownership of the service accounts and identify one or more new secondary owners for the accounts.

A secondary owner of the user account may evaluate the user account to determine whether the user account is necessary for any purpose. For example, the user account may include information that is critical for tasks performed by other users of the user account and that are performed on behalf of the customer datacenter or other entity. Alternatively, the secondary owner of the user account may determine that the user account does not include any necessary information and can be removed altogether. The secondary owner of the user account may transmit a request to the identity mapping service to remove the user account. Thus, the identity mapping service may determine 818 whether to remove the user accounts. If a secondary owner of the user account has requested removal of a user account, the identity mapping service may remove 820 the user account previously owned by the primary owner removed from the user account. In some instances, the identity mapping service may transmit a notification to each owner of service provider users associated with any of the removed user accounts to inform these owners that the user account is no longer available. However, if the identity mapping service determines that the user account is not to be removed or the user account is not a service account, the identity mapping service may remove 814 the user specified in the original request from the identified user account. The identity mapping service may update the interface presented to the administrator or owner of the user account to indicate that the service provider user has been removed successfully.

Figure 9:
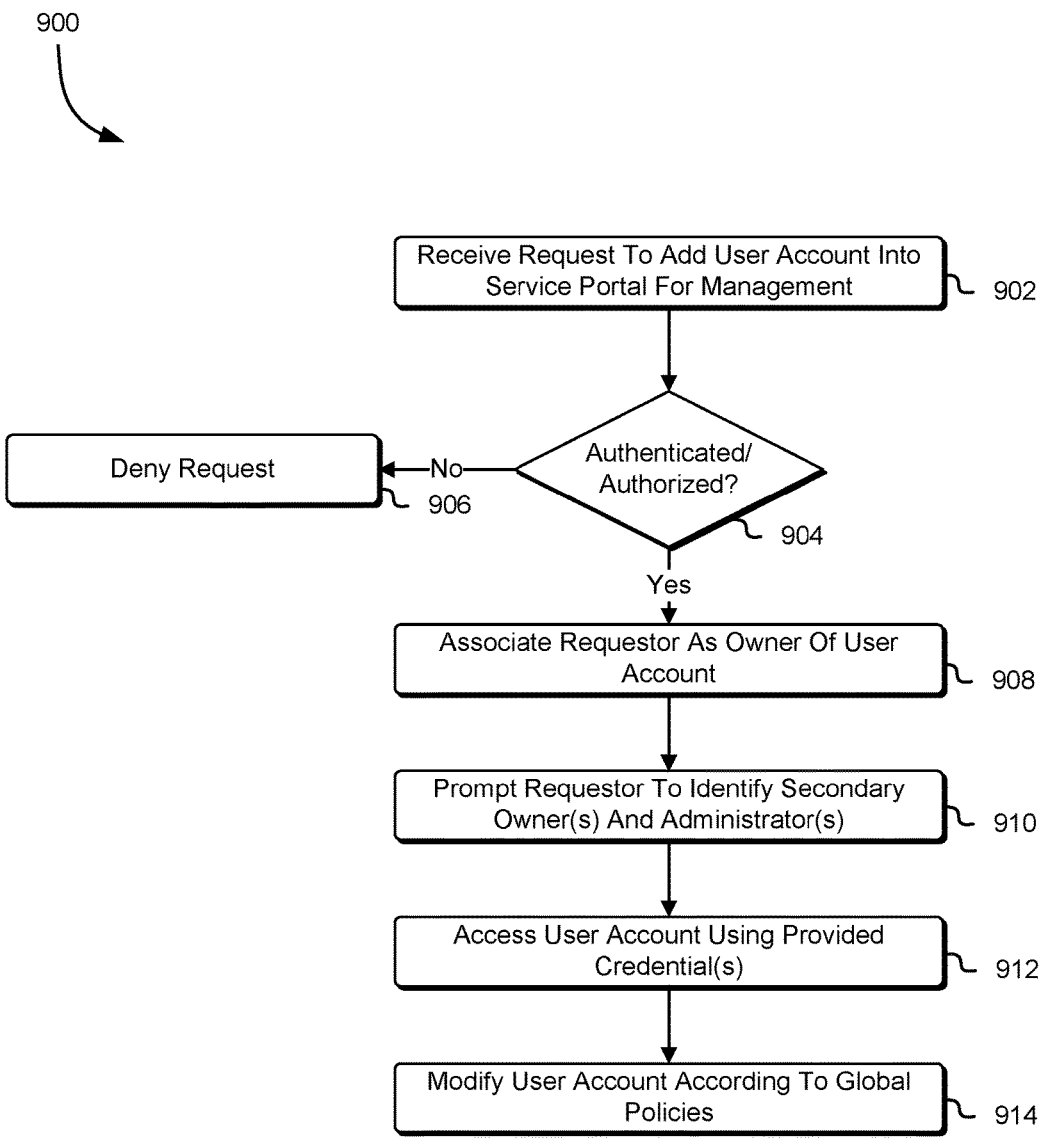
FIG. 9 shows an illustrative example of a process for adding one or more computing resource service provider accounts to the identity mapping portal for management in accordance with at least one embodiment.

As noted above, a user account administrator or owner that manually creates a new user account for service provider users can access the identity mapping service via a federated identity to add the new user account into the identity mapping service portal for management. This user account administrator or owner may be designated as the owner of the user account by the identity mapping service. Further, the identity mapping service may apply one or more policies to the user account, including any global policies that may be implemented by an administrator or owner of the customer organization. Accordingly, FIG. 9 shows an illustrative example of a process 900 for adding one or more computing resource service provider accounts to the identity mapping portal for management in accordance with at least one embodiment. The process 900 may be performed by the identity mapping service.

An administrator or owner of a user account may access the computing resource service provider via a federated identity to manually create a new user account. In order to manage the user account, the administrator or owner of the user account may access the identity mapping service via its federated identity to add the new user account into the identity mapping service portal for management and monitoring. Thus, the identity mapping service may receive 902 a request from an account administrator or owner to add the newly created user account to the identity mapping service portal for management. Similar to the process 800 described above, in response to the request, the identity mapping service may determine 904 whether the administrator or owner of the one or more user accounts has been authenticated by its identity broker and is authorized to remove service provider users from the user accounts. If the administrator or owner of the user account has not been authenticated or is not authorized to add the user account to the portal for management, the identity mapping service may deny 906 the request.

If the administrator or owner of the user account is authorized to add the user account to the portal for management, the identity mapping service may associate 908 the requestor as the owner of the user account. The identity mapping service may access a policy management service to generate a policy for the user account specifying ownership of the user account to the administrator or owner of the user account that added the user account to the portal. Alternatively, the identity mapping service may maintain a profile for the user account which may specify the identity and contact information for the owner of the user account. This profile may be updated to specify that the administrator or owner of the user account is indeed the owner of the user account.

The identity mapping service may further prompt 910 the requestor (e.g., the administrator or owner of the user account) to identify one or more secondary owners or administrators for the user account. For instance, the identity mapping service may utilize the portal interface to provide the requestor with one or more text-based fields or other fields for identifying the secondary owners and administrators. The requestor may provide an identifier for each secondary owner and administrator, as well as contact information for each secondary owner and administrator. The identity mapping service may utilize this information to contact each identified secondary administrator and owner of the user account to allow each secondary administrator and owner to acknowledge acceptance of their role. Further, the identity mapping service may update the profile for the user account to specify these new secondary administrators and owners.

In addition to prompting the user account administrator or owner to identify secondary administrators and owners, the identity mapping service may access 912 the user account using the provided credentials to determine whether the user account is in compliance with the one or more global policies established by the administrator or owner of the customer organization. For example, the identity mapping service may determine whether there are any existing service provider users associated with the user account. If there are, the identity mapping service may assign ownership of these users to the user account administrator or owner. This may enable the user account administrator or owner to assign new owners for these service provider users, such as through the process 500 described above. Additionally, the identity mapping service may modify 914 the user account according to the identified global policies to ensure that the user account is in compliance with these policies.

Figure 10:
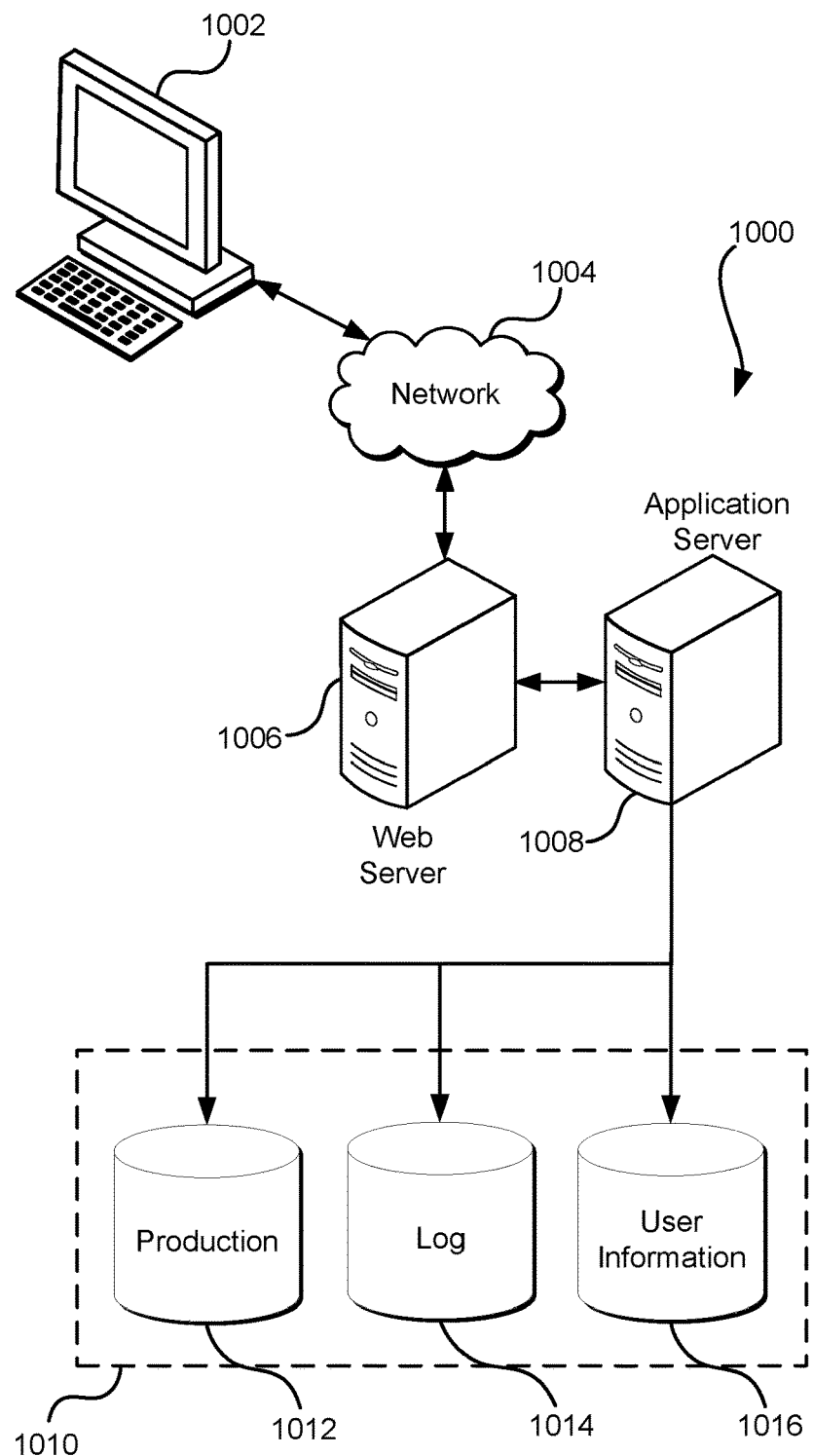
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes, and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   under the control of one or more computer systems configured with executable instructions,
      receiving, from an administrator of a user account via a federated identity generated through an identity broker of a customer datacenter, a request to add a new service provider user to the user account, the request specifying an electronic address for a user of the customer datacenter authorized to utilize the new service provider user and a role that the new service provider user can assume for the user account;
      validating the federated identity;
      as a result of validating the federated identity, generating, for the user of the customer datacenter, a hashed key for identifying the user of the customer datacenter;
      embedding the hashed key into a link usable by the user of the customer datacenter to access a portal for managing the new service provider user;
      transmitting, using the electronic address for the user of the customer datacenter, the link and the hashed key;
      receiving, from the user of the customer datacenter via a second federated identity a claim of access to the hashed key, where the second federated identity is generated through the identity broker of the customer datacenter;
      associating the new service provider user with the user account, one or more policies applicable to the user account, the user of the customer datacenter; and
      providing, in response to obtaining a username from the user of the customer datacenter, the user of the customer datacenter with a temporary password to enable the user of the customer datacenter authorized to utilize the new service provider user to access one or more computing resources associated with the user account.

2. The computer-implemented method of claim 1, wherein the method further comprises:
   receiving, from the administrator of the user account via the federated identity generated through the identity broker of the customer datacenter, a request to modify a policy applicable to users of the user account;
   identifying one or more global policies applicable to the user account;
   determining whether modification of the policy conflicts with the one or more global policies; and
   as a result of determining that the modification of the policy complies with the one or more global policies, applying the modification of the policy to users of the user account.

3. The computer-implemented method of claim 1, wherein the method further comprises:
   receiving a request to remove the user from the user account;
   determining whether the user is an administrator of one or more other user accounts;
   removing the user from the user account;
   if the user is an administrator of one or more other user accounts, identifying one or more secondary administrators of the one or more other user accounts; and
   in response to a request from the one or more secondary administrators to remove the one or more other user accounts, removing the one or more user accounts.

4. The computer-implemented method of claim 1, wherein the method further comprises:
   receiving a request to add a second user account to the portal accessible by the administrator via the federated identity to enable management of the second user account through the portal;
   associating the administrator of the user account as a user authorized to manage the second user account;
   transmitting a request to the administrator of the user account to identify one or more secondary users authorized to manage the second user account;
   accessing the second user account to associate the one or more secondary users authorized to manage the second user account with the second user account; and
   modifying the second user account to conform to one or more global policies for user accounts.

5. A system, comprising:
   one or more processors; and
   memory including instructions that, when executed by the one or more processors, cause the system to:
      receive, from a first user having privileges sufficient to manage an account via a federated identity generated through an identity broker of a first entity, a request to add a new user to the account, the request specifying an electronic address for a user of the first entity authorized to utilize the new user;
      validate the federated identity;
      as a result of validating the federated identity, generate a link usable by the user of the first entity to access the new user;
      use the electronic address to transmit the link to the user of the first entity;
      in response to obtaining a message at an endpoint associated with the link, prompt the user to provide a new username;
      associate the new user with the account and one or more policies applicable to the account and users of the account based at least in part on obtaining the new username; and
      enable the user of the first entity authorized to utilize the new user to utilize the new user to access one or more computing resources associated with the account.

6. The system of claim 5, wherein the instructions further cause the system to:
   receive, from the first user via the federated identity, a request to add a second account to a portal accessible by the first user to enable management of the second account through the portal;
   associate the first user as a user authorized to manage the second account;
   identify one or more secondary users authorized to manage the second account; and access the second account to associate the one or more secondary users authorized to manage the second account with the second account.

7. The system of claim 5, wherein the instructions further cause the system to:
receive, from the first user via the federated identity, a request to modify a policy applicable to the account;
determine whether modification of the policy conflicts with one or more other policies applicable to the account; and
as a result of determining that the modification of the policy complies with the one or more other policies, access the user account to apply the modification of the policy to the account.

8. The system of claim 7, wherein the instructions further cause the system to apply one or more conflict resolution rules to the policy and the one or more other policies applicable to the account if the modification of the policy conflicts with at least one of the one or more other policies.

9. The system of claim 5, wherein the instructions further cause the system to:
embed, in the link, a hashed key usable to authenticate the user;
receive, from the user via a second federated identity generated through the identity broker of the first entity, a claim of access to the hashed key; and
authenticate the user based at least in part on the claim of access to the hashed key.

10. The system of claim 5, wherein the instructions further cause the system to provide the user with a temporary password to enable the user to utilize the new user to access one or more computing resources associated with the account.

11. The system of claim 5, wherein the instructions further cause the system to:
receive, from the first user via the federated identity, a request to remove a second user from the account;
determine whether the second user is designated as being authorized to manage one or more other accounts;
remove the user from the account; and
if the second user is designated as being authorized to manage the one or more other accounts:
identify a third user designated as being authorized to manage the one or more other accounts; and
enable the third user to determine whether the one or more other accounts can be removed.

12. The system of claim 5, wherein the instructions that cause the system to prompt the user to provide the new username further include instructions that, when executed by the one or more processors, cause the system to:
transmit a request to the user of the first entity authorized to utilize the new user to generate a unique identifier for the new user; and
associate the unique identifier with the new.

13. A non-transitory computer-readable storage medium having stored thereon executable instructions that, as a result of being executed by one or more processors of a computer system, cause the computer system to at least:
verify, based at least in part on a federated identity of a first user of an account, obtained from an identity broker of a datacenter, and in response to a request to generate a new user for the account, that the first user of the account is authorized to generate the new user for the account;
obtain an electronic address for a user authorized to utilize the new user;
transmit, using the electronic address for the user, a link to enable the user to access the new user via a second federated identity generated through the identity broker of the datacenter, where the access is provided in response to obtaining a username from the user; and
associate the new user with the account and one or more policies applicable to the account and users of the account.

14. The non-transitory computer-readable storage medium of claim 13, wherein the instructions further cause the computer system to:
receive, from the first user via the federated identity, a request to remove a second user from the account;
determine whether the second user is designated as being authorized to manage one or more other accounts;
remove the user from the account;
if the second user is designated as being authorized to manage the one or more other accounts, identify one or more secondary users designated as being authorized to manage the one or more other accounts; and
transmit a notification to the one or more secondary users to indicate that the second user has been removed from the account.

15. The non-transitory computer-readable storage medium of claim 13, wherein:
the link includes a hashed key usable to authenticate the user authorized to utilize the new user; and
the instructions further cause the computer system to:
receive, from the user, the hashed key; and
authenticate the user based at least in part on validating the hashed key.

16. The non-transitory computer-readable storage medium of claim 13, wherein the instructions further cause the computer system to:
transmit a request to the user to generate an identifier for the new user;
receive, from the user, the identifier for the new user;
determine whether the identifier for the new user provided by the user is unique relative to one or more other identifiers associated with the account; and
as a result of the identifier for the new user being unique, associate the identifier with the username.

17. The non-transitory computer-readable storage medium of claim 13, wherein the instructions further cause the computer system to:
receive, from the first user of the account via the federated identity, a request to modify a policy applicable to the account;
determine whether modification of the policy complies with one or more other policies applicable to the account; and
as a result of determining that the modification of the policy complies with the one or more other policies, apply the modification of the policy to the account.

18. The non-transitory computer-readable storage medium of claim 17, wherein the instructions further cause the computer system to deny the request to modify the policy applicable to the account if the modification of the policy conflicts with at least one of the one or more other policies.

19. The non-transitory computer-readable storage medium of claim 13, wherein the instructions further cause the computer system to:
receive, from the first user of the account via the federated identity, a request to create a second account accessible by the first user, the request specifying one or more secondary users authorized to manage the second account;

associate the first user as a user authorized to manage the second account; and access the second account to associate the one or more secondary users authorized to manage the second account with the second account.

20. The non-transitory computer-readable storage medium of claim 13, wherein the instructions further cause the computer system to provide the user authorized to utilize the new user with a temporary password to enable the user to access one or more computing resources associated with the account.

* * * * *